Patented Nov. 29, 1949

2,489,761

UNITED STATES PATENT OFFICE 2,489,761

TRACE IRON SALT

Joseph A. Dunn, Winchester, Mass., and Frank G. Miller, Denville, N. J., assignors to General Foods Corporation, New York, N. Y., a corporation of Delaware No Drawing. Original application June 15, 1948, Serial No. 33,226. Divided and this application August 29, 1949, Serial No. 113,028

7 Claims. (Cl. 99—2)

This invention relates to the addition of trace mineral supplements to the normal animal diet (including humans as well as domestic animals and fowls) and more particularly to the incorporation of such supplements in salt and the prevention of loss thereof from the salt before consumption. This application is a division of our copending application Serial No. 33,226 filed June 15, 1948, which in turn is a continuation in part of our prior applications Serial Nos. 704,285 and 704,286 filed October 18, 1946, both now abandoned.

A few principal mineral elements make up the greater part of the mineral content of the animal body, including calcium, magnesium, sodium, potassium, phosphorus, sulphur and chlorine. The average animal diet is fairly well supplied with these principal mineral elements. However, other dietary minerals are utilized in very small amounts as compared with the principal mineral elements so that they are commonly referred to as "trace elements," and it is well known that the normal animal diet often fails to supply even the very small daily requirements of certain of these trace elements. The dietary supplements required to meet such deficiencies may vary from time to time and from place to place as the constitution of the normal diet varies.

Accordingly the addition of trace element supplements to the diet is frequently necessary or desirable. These supplements must of course be edible in the sense that the small amounts actually ingested do not cause objectionable toxic effects, and also such that the trace elements per se become available to the animal during digestion. When such very small amounts of trace element supplements are simply mixed with the far larger volumes of food normally consumed, it is difficult to obtain uniform administration to individuals. However, salt is a universal constituent of the animal diet which is consumed in small but fairly constant daily rations, and for these reasons is an excellent medium for incorporating trace element supplements in the diet. The desired supplements are simply mixed with the salt in proportions that will furnish appropriate amounts of minerals, taking into account the requirements of the animal and the daily ration of salt consumed. Because the daily consumption of salt is small, the much smaller ration of trace element supplement may amount to as much as 2–3% by weight of the salt in some cases, although usually it will be less than 1%.

Thus it has been proposed to add trace element supplements to salt for use on the table or in the kitchen or for feeding animals, especially iodine in the form of potassium iodide. In many instances, however, salt to which such trace element supplements have been added is found to be substantially or completely devoid of trace elements when consumed after a relatively short period of time. In the case of iodine, this loss has been generally attributed to oxidation resulting in liberation of free iodine, but iodine continues to be lost in spite of the most effective measures that can be devised to prevent oxidation (see for example Hart Patent No. 1,144,150, Shumaker et al. Patent No. 2,164,089, See Patent No. 2,170,611, Russell Patent No. 2,331,424, and Whitmoyer Patent No. 2,382,193). Furthermore, the same loss has been observed in the case of non-volatile and non-oxidizable trace elements such as trace metals.

We have discovered that the above mentioned losses are due in large part, if not entirely, to solution of the trace element compounds used in water or salt brine and actual leaching out of the compounds from the salt mass. Although salt is a very advantageous medium from the above standpoints for incorporating trace element supplements in the diet, it is also very hydroscopic and absorbs large amounts of moisture from the atmosphere. As moisture continues to be absorbed by the salt, water or salt brine gradually percolates through the salt mass and collects at or drips from the bottom of the mass. The trace element compounds are present only in very small amounts and moreover are admixed in finely divided form with the salt so that they are distributed as small particles on the surfaces of the salt crystals and constitute a sort of external phase which tends to be preferentially dissolved. Under these conditions, the small amounts of trace element compounds are rapidly dissolved, even though they may be only very sparingly soluble in water or salt brine.

Such percolation of moisture with the effects described above takes place not only in loose salt but even in the salt blocks which are placed at suitable points as salt licks for cattle and other animals, as for example in feeding sheds, in the open near feeding or watering places, or often on stakes in the open field. The blocks, usually in 50 lb. sizes, are conventionally made by compressing ordinary salt under pressure of the order of ten tons per square inch, resulting in dense solid masses that are practically vitreous in character and apparently are substantially impervious. However, their density is not equal to the density of solid crystalline salt, the specific gravity of which is 2.16 whereas the specific gravity of salt blocks is 2.02 plus or minus depending on the pressure used and the crystalline character of the salt. Thus the blocks contain about 7% of void spaces and to this extent are porous or capillary in nature. We have found that moisture deposited and/or absorbed at the surface of such a block gradually diffuses or percolates throughout the block under the influence of capillary action and gravitation.

The percolating moisture first dissolves both salt and trace element compounds from the surface layer of the mass of salt and, as the solution percolates inwardly and downwardly through the mass, its concentration of both trace element compound and salt progressively increases until it passes out of the bottom. Percolation takes place under humid conditions regardless of whether the salt is exposed to light and/or rain or not; in other words, the same loss of trace elements occurs during storage of the block in the dark in a humid warehouse or the like, particularly if the relative humidity of the surrounding atmosphere is above the critical range for salt of 70–75%. The surface layer of salt is first very rapidly depleted of trace elements which migrate both toward the center of the salt mass and toward its bottom. The zone of surface depletion steadily increases in depth and the concentration of trace elements in the interior first rises and then rapidly falls as the trace element compounds are lost by escape of the percolating solution from the bottom of the mass.

Thus complete depletion of a 50 lb. salt block may occur within 30 to 60 days simply by exposing it to a humid atmosphere, and this depletion is quite independent of illumination or exposure to sunlight. More important, however, is the fact that practically complete depletion of the surface layer may take place within a very few days, after which animals licking the block get nothing but salt because the rate of consumption of the block is seldom if ever as great as the rate of increase in depth of the depleted surface zone. It makes no difference how much trace element is retained in the center of the block if there is none in the surface layer licked by the animal. The same loss of trace elements occurs even more rapidly in the case of masses of loose salt because of the greater porosity of the mass and the relative ease with which moisture may enter and percolate through the mass. In this case the effect of surface depletion can be reduced by stirring or agitating the mass, but this is not feasible during storage and is seldom practiced once the salt is placed in the feed trough for the animals. Even in the ordinary salt shaker or open salt cellar used in the kitchen or on the table, it is a common experience in damp, humid weather to find drops of water or brine or crusted salt adhering to the shaker or cellar, usually at the bottom of the salt mass. Trace element compounds originally distributed throughout the salt become concentrated in such liquid phases and to a large extend remain in the shaker or cellar when salt is removed therefrom.

The chief object of the present invention is to prevent such losses of trace element supplements and to maintain the compounds in uniform admixture with the salt regardless of the conditions to which it may be exposed so that the intended supplementation of the diet is secured as the salt is gradually consumed.

The present application is directed particularly to the trace metal iron. Reference is made to our copending applications Serial Nos. 33,223, 33,224, 33,225 and 33,226 filed June 15, 1948, and directed to supplementation of the diet with other supplemental minerals.

We avoid depletion of iron due to percolating moisture by the use of iron compounds that are substantially insoluble in the moisture taken up by the salt and in the brine solution resulting from percolation of this moisture through the salt. Complete insolubility is not necessary, the limiting condition being that the ratio of solubility of the compound in water containing 0–26% NaCl to the solubility of salt in water should not be substantially greater than the original ratio of said compound to the salt. As previously indicated, the amount of trace metal compound will usually be less than 1%, although in special cases 2–3% may be used. The ratio of solubilities must be limited accordingly. If this limiting value is exceeded, the trace metal compound will be dissolved and lost at greater rate than the salt and depletion will take place, beginning in the surface layer of the salt as stated above. If the limiting value is maintained, however, the proportion of compound to salt, particularly in the surface layer of the salt, will remain unchanged although of course there will be a gradual loss in total weight of the salt mass. At less than the limiting value of the solubility ratio, on the other hand, the proportion of trace metal compound to salt will increase somewhat not only in the mass as a whole but also at its surface.

It will be understood that such insolubility in water containing 0.26% NaCl must be coupled with a substantial degree of solubility in the digestive fluids found in the gastro-intestinal tract of the animal, in order that the trace metal itself may become available to the animal during digestion.

The relative solubilities of a particular trace metal compound in brine and of salt in water may be ascertained from known data or determined by experiment if such data are not available. In this connection, it is known that the solubility of a substance in a solution is a function of the concentration of other substances in the solution. It is also known that the dispersibility of colloidal material in a solution is a function of the amount of electrolyte present in the solution. These two phenomena are highly important factors in the present invention because the moisture taken up by the salt and percolating through it may vary in salt concentraction from zero to saturation (i. e., 0–26%). Some compounds increase in solubility in salt brine as the salt content increases while others decrease in solubility, being more soluble in pure water. Still others exhibit their maximum solubility or dispersibility at intermediate salt concentrations. For the purposes of the present invention, the compounds used should be substantially insoluble and non-dispersible (i. e., non-peptizable in the true colloidal sense) in water containing 0–26% salt.

Instead of ascertaining relative solubilities, a simple method of determining whether the desired conditions will be obtained with any given compound is to analyze the drip from a test sample held in an atmosphere of high humidity. As long as the proportion of trace metal compound to salt in the drip does not exceed substantially the original proportion of said compound to salt in the test sample, the retention of the trace metal in the salt is satisfactory.

In using this testing method, we have found it satisfactory to employ the following procedure. Small test blocks (approximately 5 gm. in weight) were formed with a laboratory hydraulic press applying pressures equivalent to those used in the commercial production of salt blocks. A series of these small blocks were suspended over suitable test tubes and exposed to a relative humidity of 90% or higher for 43 hours after which the blocks and the respective samples of drip collected in the test tubes were analyzed for their salt and trace metal content. For convenience the results of these analyses were expressed in terms of the percentage of the original content of trace metal compound remaining in the test block, 100% retention meaning that none of the trace metal was lost in the drip.

Under the above test conditions, the salt loss from a test block will vary from 5% to 10%. Hence retention figures in the range 90-95% reflect equal rates of loss of trace metal and salt. In other words, the proportion of trace metal to salt in the block after the test and also in the drip is the same as in the original block. Retention values above 90-95% indicate loss of salt at a faster rate than trace metal and a consequent increase in concentration of the metal in the block. On the other hand, retention values of less than 90-95%, particularly those less than 85%, indicate that the trace metal is being lost at a sufficiently faster rate than the salt to result in undesirable depletion of the metal from the salt.

We have correlated results obtained in such rapid retention tests with practical experience when 50 lb. cattle blocks are held in damp warehouses or exposed in the field, and have determined that when retention values of about 85% and higher are obtained with the rapid retention test, the corresponding commercial blocks are effectively stabilized against loss of trace metal compounds. We have also demonstrated that when retention values of 95-100% are obtained with the rapid retention test, the corresponding commercial blocks when stored in damp warehouses or exposed in the field will actually increase in their proportion of the trace metal compound because the salt is preferentially dissolved. This increase is particularly evident at the surface of the block where the trace metal compound is immediately available to the animal at all times.

In case the trace metal supplement is to be incorporated in loose salt, the foregoing test procedure can be simplified and at the same time brought into closer conformity with practical conditions by suspending a small mass of the loose salt in a bag or on a screen which allows passage of the drip. Preferably the bag or screen should be of material that does not absorb appreciable amounts of the percolating solution, as otherwise retention of salt and/or trace metal compound in the material may complicate the analysis.

The useful iron compounds are subject to the three basic requirements mentioned above, namely, that they are edible (i. e., non-toxic), that they are soluble in the digestive tract, and that they are substantially insoluble in water containing 0-26% salt. Within these limitations, however, many different types of iron compounds will be found suitable. For example, suitable types of inorganic compounds are the carbonates, hydroxides and oxides, although a number of other miscellaneous inorganic compounds may be used. In the case of iron, ferric hydrate may be formed in the salt by adding reduced iron. Various sulphides may also be used as for example the mineral sulphide troilite (FeS). Certain organic compounds of iron are also satisfactory, such as the soaps of higher fatty acids. It will be evident that the compound used may include more than one supplemental mineral, as for example, the combination of a trace metal and a trace halogen such as iodine. The following are listed as examples:

Basic ferric acetate
Ferrous carbonate
Ferrous hydroxide
Ferric hydroxide
Ferrum reductum
Ferrous oleate
Ferrous stearate
Ferrous palmitate
Ferrous behenate
Ferrous arachidate
Ferrous oxide
Ferric pyrophosphate
Ferric orthophosphate
Sodium iron pyrophosphate
Troilite (FeS)

Assuming that reduced iron is to be used, about 0.10% thereof by weight of the salt is suitable in the average case. As another example, ferric hydroxide may be added to a salt block in the amount of about 0.20% by weight of the salt.

It will be understood, however, that these particular iron compounds are only by way of example and that any other suitable compound can be substituted therefor. Also the amounts of the iron compounds set forth above are based on the amounts of iron per se that are desired in the animal diet, and where other compounds are substituted they should be used in amounts determined on the same basis. On the other hand, the amount of iron that is needed will depend upon the normal constitution of the animal diet in the region where the salt is to be used. Hence the proportions of iron compounds given above are subject to considerable variation, but will usually be less than 1%. In special circumstances, however, as much as 3% may be desirable. It may also be desirable, of course, to add other trace mineral supplements to the salt mass together with iron.

In the case of salt blocks, it is often desirable to color the supplemented blocks to distinguish them from ordinary blocks. The trace metal compounds themselves may provide sufficient coloring for this purpose; for example, lazurite, which is a source of nutritional sulphur, produces a blue color. Pigments may be added if desired, and different colors may be used to differentiate blocks of varying composition.

In controlling deficiency diseases by dietary supplements, one of the major problems is to secure approximately uniform administration of such supplements to individual animals because of the very small amounts needed, the practical difficulty of distributing such small amounts uniformly throughout feed mixtures, etc. It will be seen that salt embodying the present invention eliminates such difficulties and provides a very convenient and practical means of administering trace elements to animals in uniform controlled amounts. The consumption of salt by an animal such as a cow, for example, will be reasonably uniform in amount depending on the daily requirement of the animal and is not materially affected by the presence of a small proportion of supplementary materials. The present invention makes it possible to disperse such materials throughout a mass of salt in definite uniform concentration, although they are present in amounts as small as a fraction of a per cent in proportion to the salt, and also to maintain such concentration substantially unchanged as the salt is consumed. Hence each daily, approximately constant ration of salt consumed by the animal contains a definite, predetermined amount of the desired supplementary materials.

In the same way, the invention may be utilized advantageously to administer trace elements and biologicals to animals for the stimulation of the animal metabolism in various respects. Such administration may be desirable even though there is no deficiency in the normal animal diet. For example, it has been found that production of milk and butter fat can be increased by the temporary administration of thyroprotein (e. g., iodinated casein) in amounts substantially above the normal requirements of the animals. This administration can be effected simply and controlled accurately by the use of salt containing appropriate amounts of thyroprotein either alone or in combination with other trace mineral supplements that may be desired. Excessive amounts of other dietary supplements, including iron, may be administered in the same manner whenever desired.

It will be understood from what has been said above that the invention in its broad aspect is not restricted to any particular iron compound, since suitable compounds of wide variety are available and selection may be made largely on the basis of availability and cost. The amounts of such compounds to be used can be determined from the normal daily requirement of the animal for iron in proportion to its daily consumption of salt, which may vary with different animals, and from the degree of deficiency of the normal diet of the animal.

Hence reference should be had to the appended claims for a definition of the limits of the invention.

What is claimed is:

1. Salt containing a trace iron supplement to the animal diet and of the type having dispersed therethrough an edible iron compound, said compound being substantially soluble in digestive fluids whereby said trace iron is made available to the animal during digestion but substantially insoluble in water containing 0-26% salt so that it is not dissolved by moisture absorbed by and percolating through the salt.

2. A salt block containing a trace iron supplement to the animal diet and of the type comprising a dense solid mass of compressed salt having dispersed therethrough an edible iron compound, said compound being substantially soluble in digestive fluids whereby said trace iron is made available to the animal during digestion but substantially insoluble in water containing 0-26% salt so that it is not dissolved by moisture absorbed by and percolating through the block.

3. Salt having dispersed therethrough not more than 3% of an iron supplement to the animal diet in the form of an edible iron compound that is substantially soluble in acid digestive fluids whereby iron is made available to the animal during digestion, the ratio of the solubility of said compound in water containing 0-26% salt to the solubility of salt in water being maximally substantially equal to the ratio of the proportion of said compound to the proportion of salt.

4. A salt block containing an iron supplement to the animal diet and of the type comprising a dense solid mass of compressed salt having dispersed therethrough an edible iron compound that is substantially soluble in acid digestive fluids whereby iron is made available to the animal during digestion but is substantially insoluble in water containing 0-26% salt so that it is not dissolved by moisture absorbed by and percolating through the block.

5. A salt block for feeding animals having not more than 3% reduced iron dispersed therethrough.

6. A salt block for feeding animals having not more than 3% iron hydroxide dispersed therethrough.

7. A salt block for feeding animals having not more than 3% ferrous oxide dispersed therethrough.

JOSEPH A. DUNN.
FRANK G. MILLER.

REFERENCES CITED

The following references are of record in the file of this patent:

UNITED STATES PATENTS

| Number | Name | Date |
|---|---|---|
| 672,672 | Green | Apr. 23, 1901 |
| 1,204,551 | Edgerton | Nov. 14, 1916 |
| 1,229,317 | Owens | June 12, 1917 |
| 2,403,010 | McHan | July 2, 1946 |